US005303062A

United States Patent [19]
Kawarai et al.

[11] Patent Number: 5,303,062
[45] Date of Patent: Apr. 12, 1994

[54] FOLDING CAMCORDER FOR COMPACT STORAGE

[75] Inventors: Takeshi Kawarai, Ibaraki; Michiaki Ezure; Seiko Nakasuna, both of Katsuta; Takanori Nishiyama, Koganei, all of Japan

[73] Assignee: Hitachi, Ltd., Tokyo, Japan

[21] Appl. No.: 634,442

[22] Filed: Dec. 27, 1990

[30] Foreign Application Priority Data

Jan. 16, 1990 [JP] Japan .................................. 2-004599

[51] Int. Cl.[5] .................................... H04N 5/225
[52] U.S. Cl. .................... 358/335; 358/906; 348/373
[58] Field of Search ............... 358/335, 906, 909, 229, 358/209; 360/33.1; 354/158; H04N 5/225

[56] References Cited

U.S. PATENT DOCUMENTS

| | | | |
|---|---|---|---|
| 4,400,743 | 8/1983 | Takimoto et al. | 358/906 |
| 4,527,205 | 7/1985 | Konishi | 360/35.1 |
| 4,531,164 | 7/1985 | Maeda et al. | 360/33.1 |
| 4,547,815 | 10/1985 | Kimura | 358/335 |
| 4,623,931 | 11/1986 | Inaga et al. | 358/227 |
| 4,695,905 | 9/1987 | Utsugi | 360/33.1 |
| 4,746,990 | 5/1988 | Katoh et al. | 358/310 |
| 4,885,643 | 12/1989 | Ichimura et al. | 358/906 |
| 4,959,729 | 9/1990 | Fukuda et al. | 358/335 |
| 4,963,987 | 10/1990 | Ichiyoshi et al. | 358/329 |

FOREIGN PATENT DOCUMENTS 59-86970 5/1984 Japan .
63-27169 2/1988 Japan .

Primary Examiner—Tommy Chin
Assistant Examiner—Huy Nguyen
Attorney, Agent, or Firm—Fay, Sharpe, Beall, Fagan, Minnich & McKee

[57] ABSTRACT

A camcorder (1) has a VCR portion (2) including a video tape drive (2a), and a camera portion (3) including a lens block (4). The VCR portion and camera portion are rotatably connected (11) for movement to a configuration convenient for photographing (FIG. 2) and to a compact configuration convenient for carrying (FIG. 1). A switch (1010) switches between a camera mode in the photographing configuration and a VCR modes in the carrying configuration. In the camera mode, the VCR portion records video signals from the lens block on the video tape and, in a VCR operation mode, the VCR portion only plays back previously recorded video tapes. The switch is mounted within one of the VCR and camera portions such that the switch is not accessible from the outside. During rotation, a linkage (100) moves a lens cover (12) between lens covering and exposing positions. In the lens exposing position, infrared transmissive portions (109,110) align with a light emitting portion (202) and a light receiving portion (203) of an autofocus range finder (201). In this manner, the camcorder folds to a compact configuration for convenience in storing and carrying and unfolds to conform to the operator's hands and body for convenience in photographing.

14 Claims, 8 Drawing Sheets

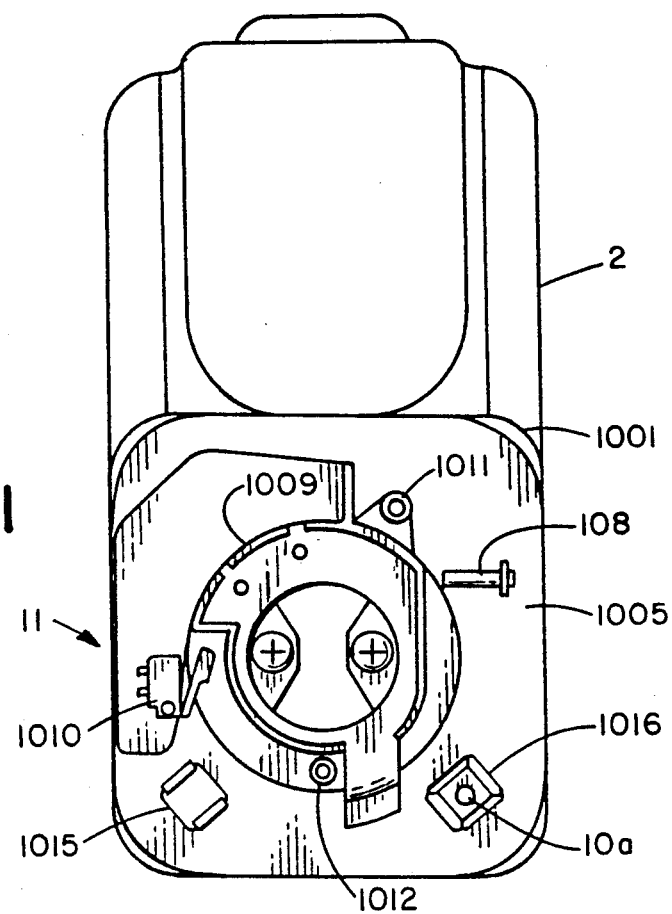
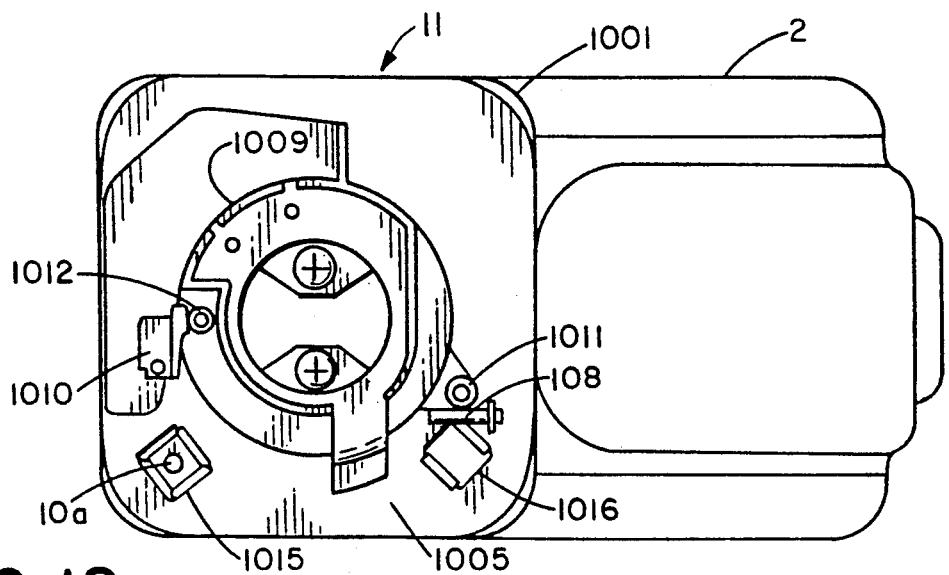
FIG.11
FIG.12

FOLDING CAMCORDER FOR COMPACT STORAGE

BACKGROUND OF THE INVENTION

The present invention relates to a camera-VCR (video cassette recorder) combination. It finds particular application in conjunction with a folding camcorder, and will be described with particular reference thereto. However, it is appreciated that the invention will also find application in conjunction with video cameras, TV-cameras, still and movie cameras, and the like, which can change its form and function.

Early video cameras and video recorders were large and bulky. In the first portable camera systems, there were separate camera and recorder modules. These modules were both heavy and difficult to carry. Moreover, the modules were inter-connected by cables which were difficult to connect and rendered the camera awkward to use. Then camcorders were developed, in which the camera module and the recorder module were combined together in a common housing. Early camcorders were record only cameras. More recent camcorders also had a reproduction or play back function. Both were still large and heavy to carry. It is desirable for camcorders to assume a compact configuration for convenience in storing and carrying. When in use, it is desirable for the camcorder to conform to the operator's hands and body for convenience in photographing.

Japanese Patent Laid Open No. 86970/1984 proposed a video camera in which a recording portion and a camera portion were connected together by a movable connecting mechanism. In a carrying configuration, the video camera was flat to facilitate storing or carrying. In an operating configuration, the recording portion was rotated 180° or slid down to open a view finder of the camera portion. However, this video camera was a record only camera. It could not reproduce or play back video tapes.

In Japanese Patent Laid Open No. 27169/1988, the applicant proposed a camera-VCR combination in which a VCR portion and a camera portion were movably connected each other. This camera-VCR combination had a reproduction or play back function during a VCR operation. Moreover, it could selectively assume a first state suitable for storing and carrying or VCR operation, and a second state suitable for photographing. In this prior application, a mode selection switch (video/camera switch 8, 26) was provided on a surface of the VCR portion. The selection switch was covered in the first state and is exposed in the second state. One problem was the potential for misusing the mode selection switch. For example, if an operator happened to touch the selection switch while photographing, the photographing was interrupted despite the operator's intention to continue the photographing.

The present invention contemplates a new and improved video camera-recorder combination which overcomes the above-referenced problems and others.

BRIEF SUMMARY OF THE INVENTION

In the present invention, a camera-VCR combination comprises a VCR portion including a video tape drive means, a camera portion including a lens block means, connecting means for movably connecting the VCR portion with the camera portion, and switching means mounted within one of the VCR and camera portions for switching between the camera and VCR operation modes in response to movement of the connecting means such that the switching means is not accessible for operation from outside of the VCR and camera portions.

In the invention, a camera-VCR includes a VCR portion housing a video tape drive means, a camera portion housing, a lens block means, a view finder portion housing, a view finder, and a grip portion operatively connected with one of the VCR, camera, and view finder portions for providing a holding grip for a operator. The invention is characterized in that at least one of the camera portion, view finder portion and the grip portion is movable with respect to the VCR portion, and a switching means is located within one of the VCR, camera, view finder, and grip portions for switching operation modes of the VCR portion in response to relative movement between the VCR portion and the at least one of the camera, view finder, and grip portions.

BRIEF DESCRIPTION OF THE DRAWINGS

The following figures are only for purposes of illustrating a preferred embodiment, and are not to be taken as limiting the invention.

FIGS. 11 and 12 are explanatory views of the connection of FIG. 10;

DETAILED DESCRIPTION OF THE PREFERRED EMBODIMENT

Figure 1:
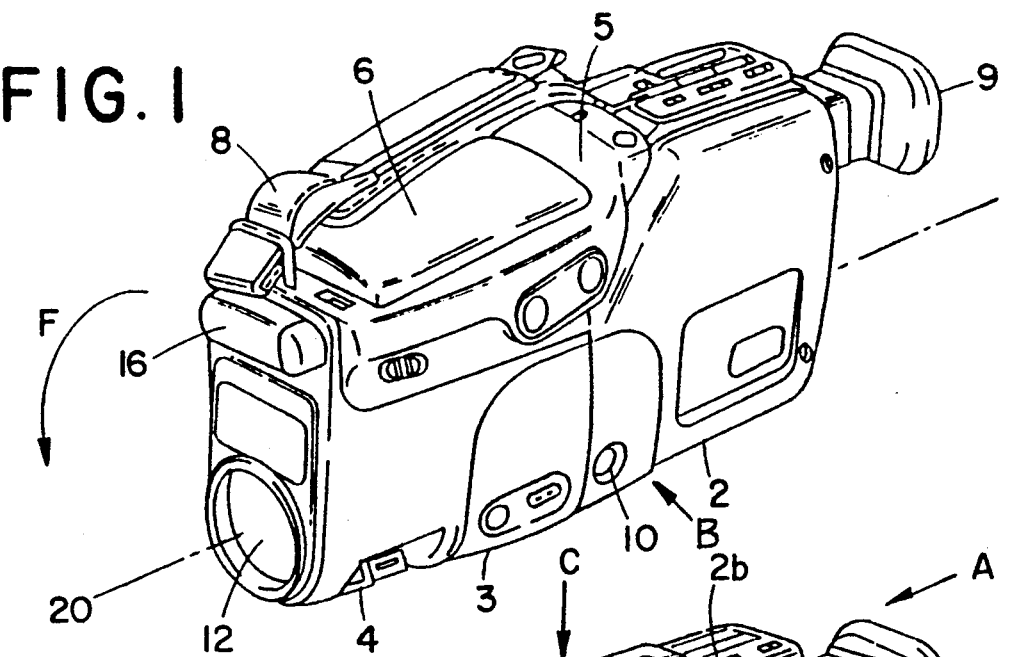
FIG. 1 is a perspective view of a camera-VCR combination embodying the invention which is in a first configuration suitable for storage and carrying or reproduction.
Figure 2:
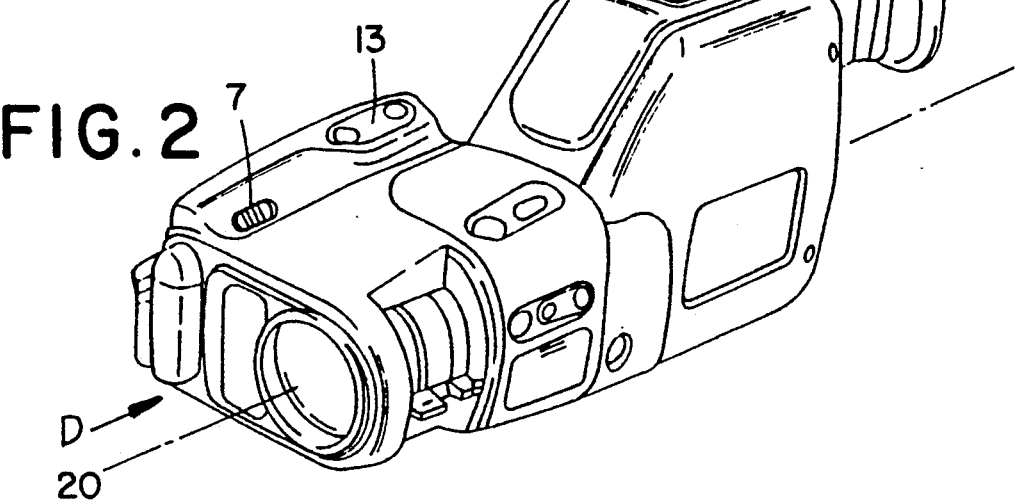
FIG. 2 is a perspective view of the camera-VCR combination which is in a second configuration suitable for photographing.
Figure 3:
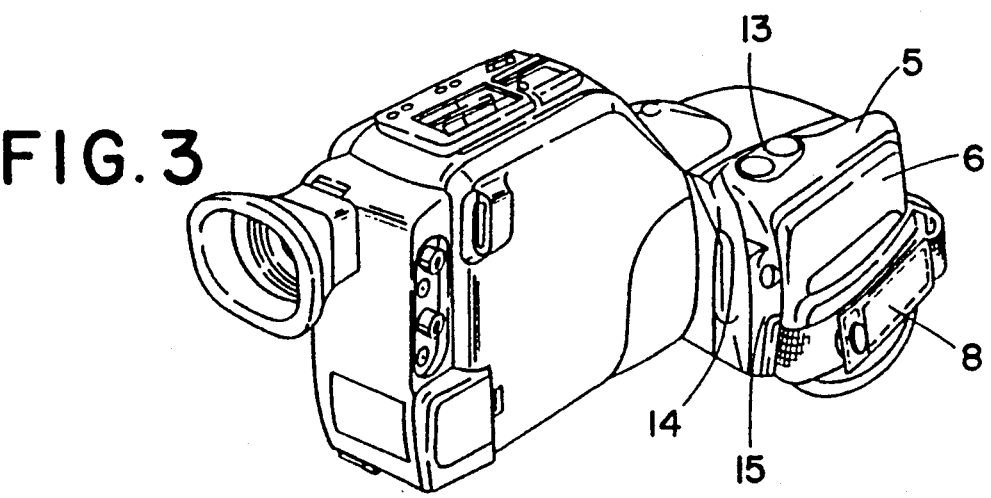
FIG. 3 is a perspective view of the camera-VCR combination as seen in the direction of arrow A in FIG. 2.

With reference to FIGS. 1, 2, and 3, a camera-VCR combination 1 includes a VCR or first body portion 2 and a camera or second body portion 3. The VCR portion 2 includes a housing that encloses a video tape drive means 2a (shown in FIG. 4) and supports control switches 2b. The video drive means 2a records and plays back video tapes. The control switches 2b control the tape drive means 2a. The camera portion 3 includes a lens block means 4 that converts received light images into electronic video signals. The lens block 4 is electrically connected with the tape drive means 2a for supplying the electronic video signals thereto to be recorded. At a side end of the camera portion 3, a grip portion 5 is mounted in parallel with the lens block 4. A battery 6 is received in the grip portion 5. A battery eject button 7 is engaged to release the battery 6 for removal. A grip belt s is releasably fixed for expansion and contraction to opposite ends of a receptacle portion for the battery 6. A view finder portion 9 is attached to the back of the VCR portion z.

A lock button 10 is disposed at one end of the VCR portion 2. The VCR portion 2 and the camera portion 3 are connected together by a connecting means 11 (FIG. 10) so as to be rotatable relative to each other. When the lock button 10 is pushed from the left to the right in FIG. 1, the camera portion 3 can rotate 90° relative to the VCR portion 2 in the direction of arrow F, from the storage configuration of FIG. 1 to the deployed configuration of FIG. 2. In FIG. 1, a lens cover 12 covers the lens block 4. In the deployed configuration of FIG. 2, the lens cover 12 is retracted to uncover the lens block 4, which is therefore open.

To photograph, the operator holds the grip portion 5 with the right hand. The grip belt 8 is positioned comfortably around the right hand to fix the right hand. A zoom button 13 is operated with two of the middle fingers, forefinger and third finger of the right hand. A start/stop button 14 is operated with the thumb of the right hand. A projecting portion 15 is formed at one end of the grip portion 5 for holding the grip portion with the right hand. In this manner, the operation of the start/stop button 14 with the thumb and the operation of the zoom button 13 with the forefinger and the middle finger can be done simultaneously and smoothly. A microphone 16 is mounted on the grip portion for catching sounds to be recorded.

Figure 4:
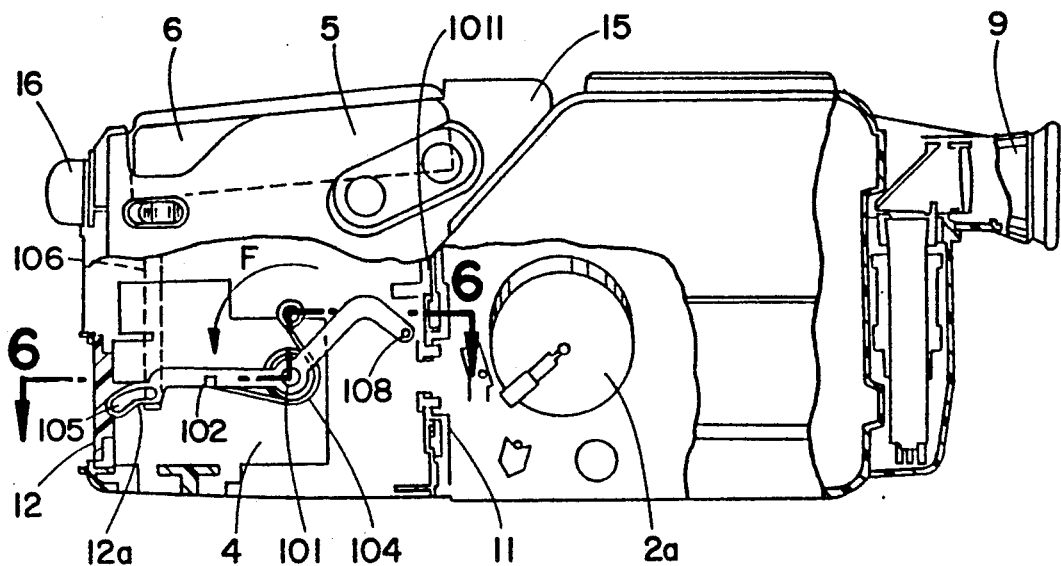
FIG. 4 is a partially cut-away front view of a principal portion in the said construction.
Figure 5:
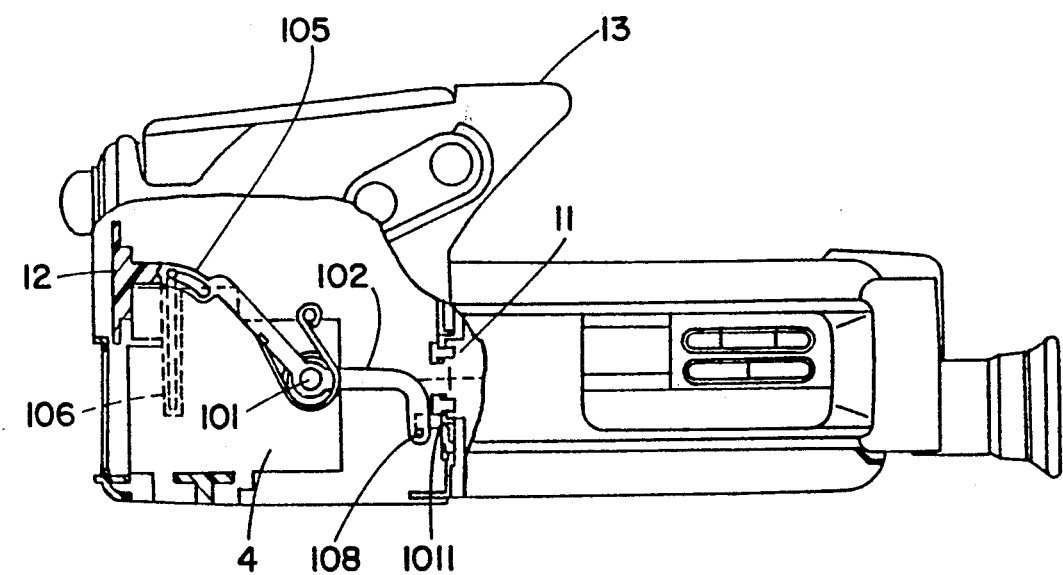
FIG. 5 is a partially cut-away plan view of a principal portion.
Figure 6:
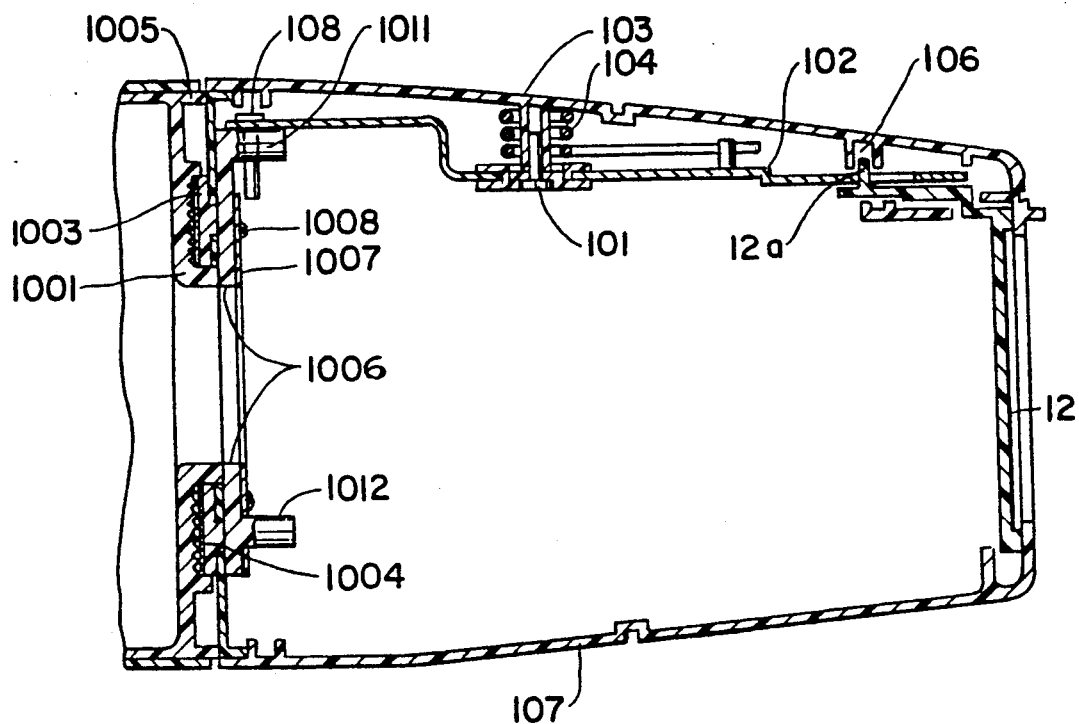
FIG. 6 is a sectional view taken on line 6—6 in FIG. 4.

A mechanism 100 for opening and closing the lens cover 12 will be now described hereinunder with reference to FIGS. 4-6. A pivotal center 101 of a pivotable arm 102 is attached to one end of a top case 103 rotatably through a torsion spring 104. An elongated slot 105 is formed in one end of the pivotable arm 102, and one end 12a of the lens cover 12 is slidably fitted in the elongated slot 105 while being restricted by a guide slot 106.

The lens cover 12 is slidably mounted in guide ways or tracks between the top case 103 and a bottom case 107. The force of the torsion spring 104 is exerted on the pivotable arm oz at all times in the direction of arrow G in FIG. 4. An arm boss 108 shown in FIG. 6 is integrally formed at the other end of the pivotable arm 102. As the pivotable arm 102 rotates about the pivotal center 101, the pivotable arm 102 causes the lens cover 12 to open and close the front face of the lens block 4. FIG. 4 shows a configuration wherein the lens cover 12 covers the lens block 4, while FIG. 5 shows a configuration wherein the lens cover 12 exposes the lens block 4.

Figure 7:
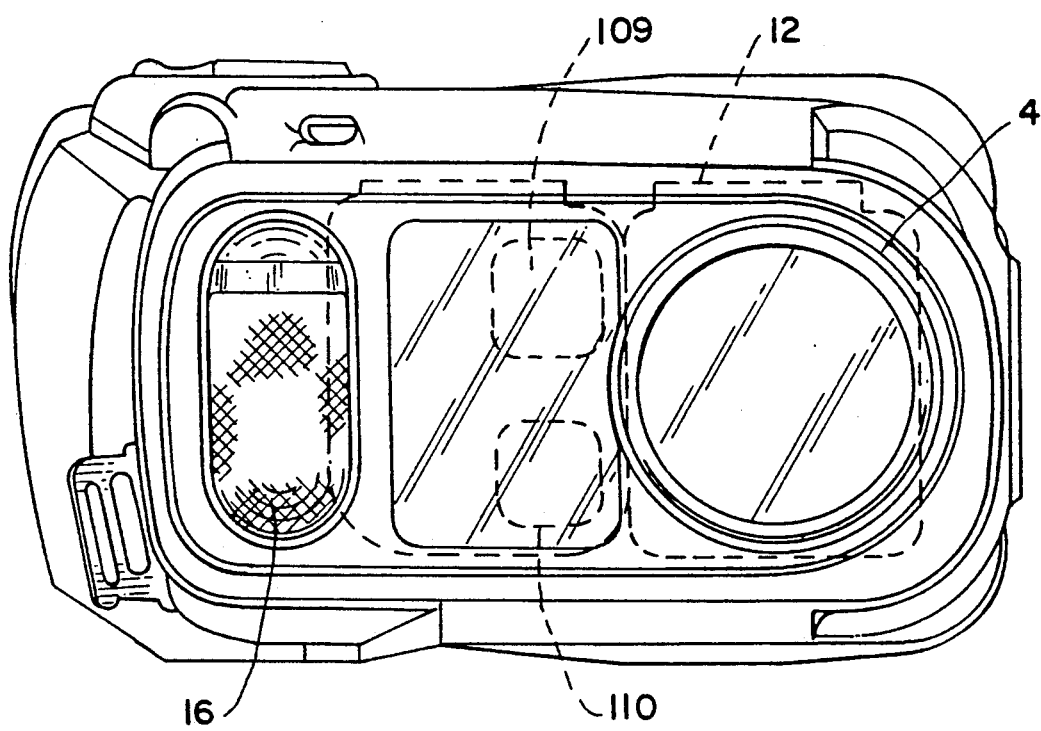
FIG. 7 is a view as seen in the direction of arrow D in FIG. 2.

FIG. 7 is a plan view as seen in the direction of arrow D in FIG. 2 with the lens cover 12 shown in phantom. The illustrated construction comprises the lens cover 12, an infrared range finding window 109, 110, and the microphone 16. The lens block 4 is disposed on the inner side of the lens cover 12.

Figure 8:
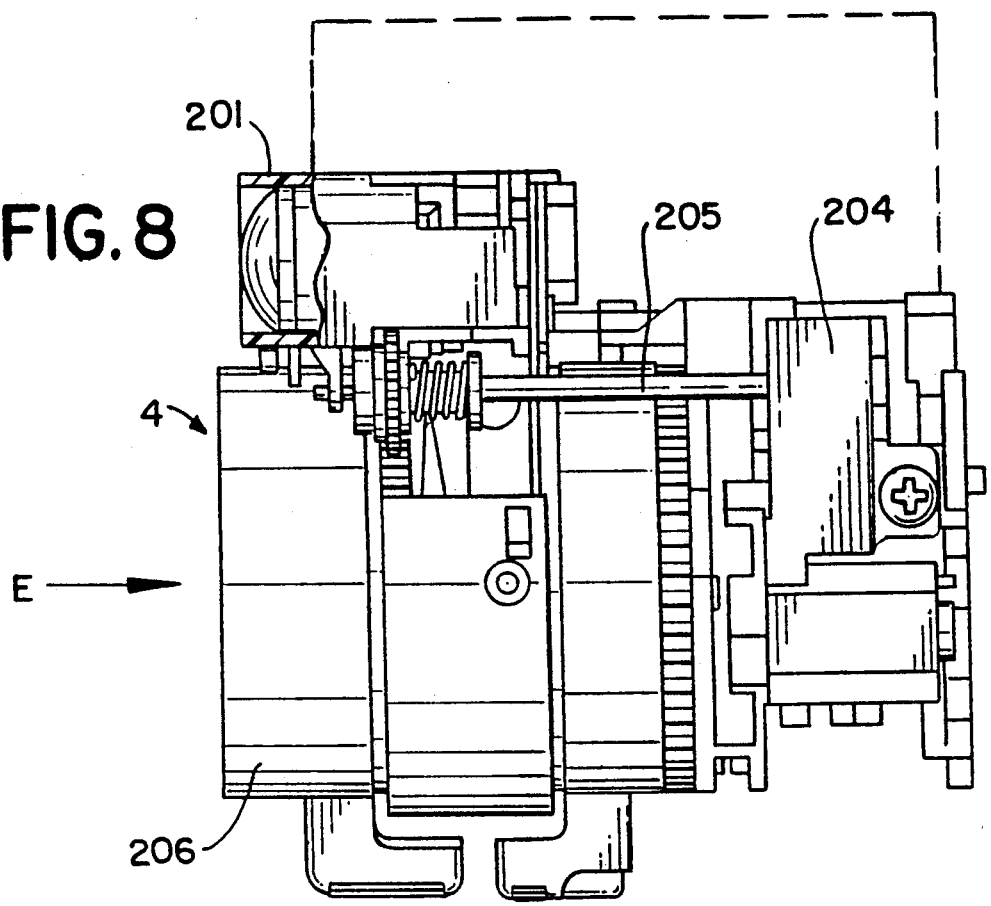
FIG. 8 is a front view showing a lens block used in this embodiment.
Figure 9:
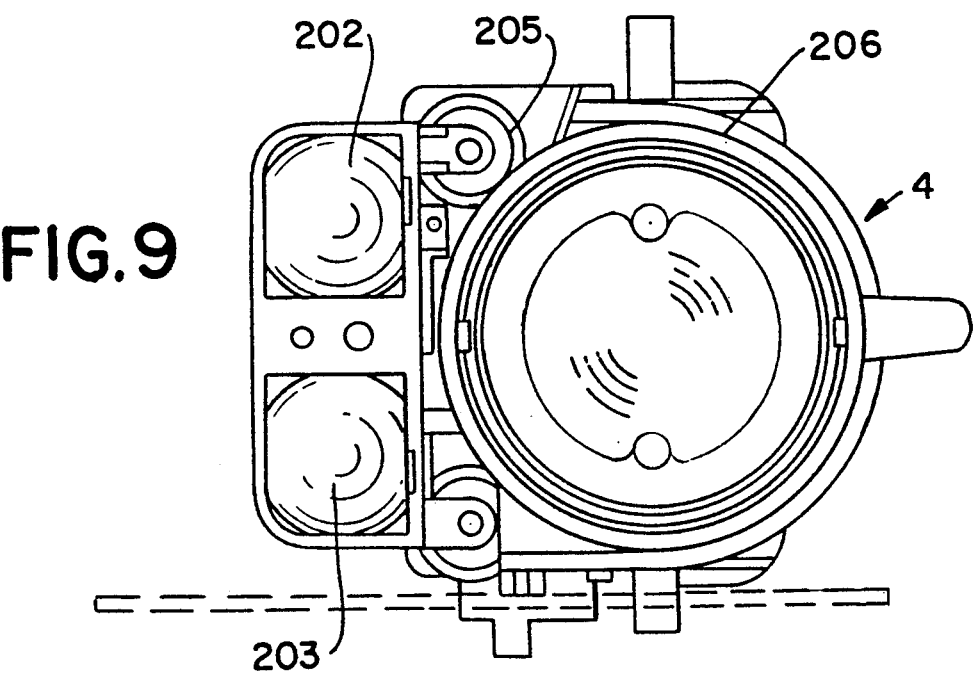
FIG. 9 is a side view of a principal portion as seen in the direction of arrow E in FIG. 8.

With reference to FIGS. 8 and 9, a infrared range finder or autofocus means 201 includes a light emitting portion 202 and a light receiving portion 203. Infrared light emitted from the light emitting portion 202 is reflected by an object (not shown) and the reflected light is received by the light receiving portion 203. Electronic circuitry uses conventional algorithms to calculate the distance to the object. The electronic circuitry controls a motor 204 to rotate a rotary shaft 205 which rotates a focusing ring 206 focusing the lens at the calculated distance. The lens cover 12 slides over the upper surface of the infrared range finder 201. At least a portion of the lens cover 12 which covers the light emitting portion 202 and the light receiving portion 203 is infrared transmissive.

Figure 10:
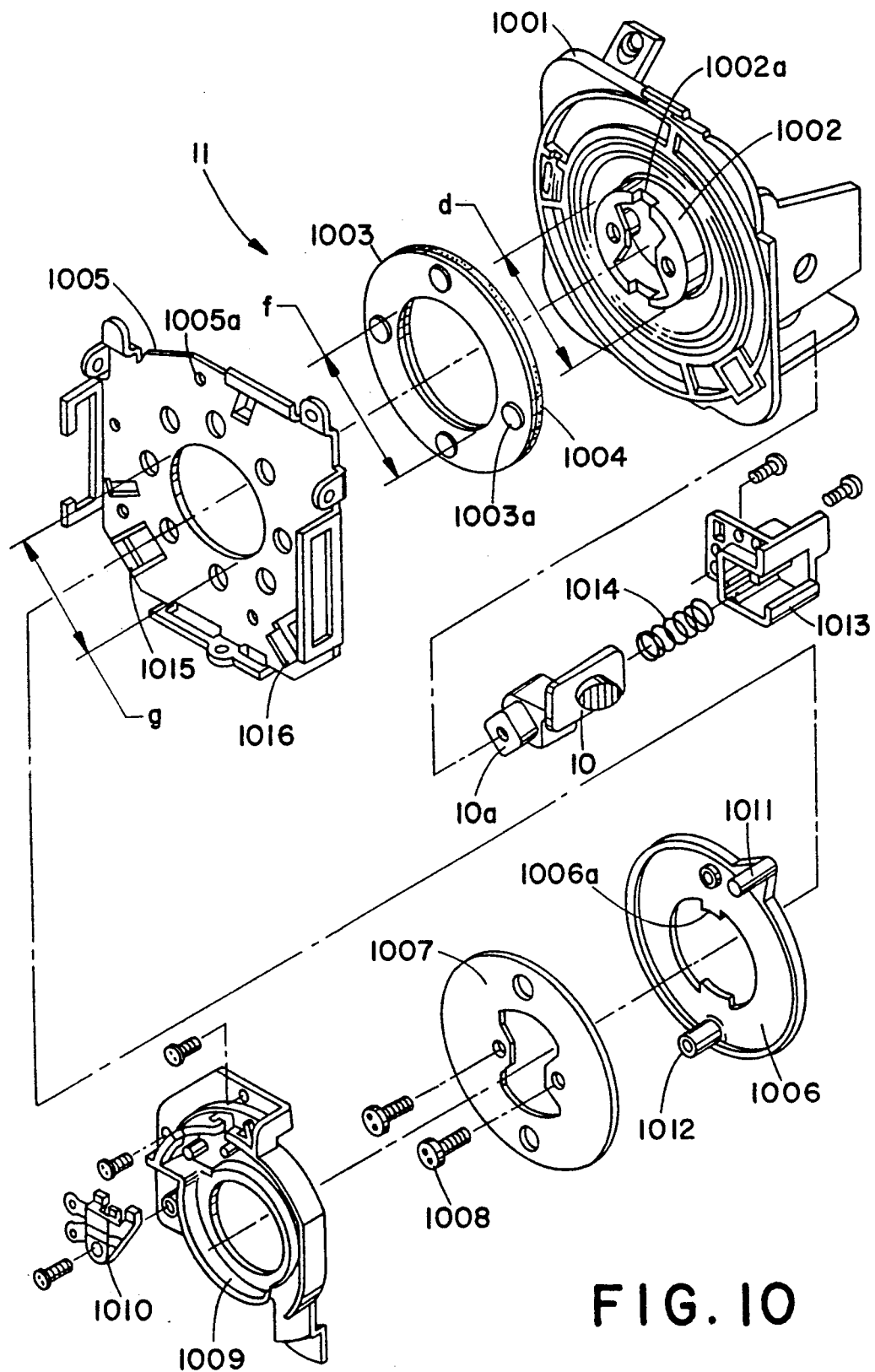
FIG. 10 is an exploded view illustrating a connection used in this embodiment.

In FIG. 10, the connection means 11 permits relative rotational movement if the VCR and camera portions about a longitudinal axis 20 of the camera shown in FIGS. 1 and 2. A VCR rotation base or member 1001 comprises a boss 1002 having a diameter "d", and a friction coupling 1003 has a hole of a diameter "f". A felt-like material 1004, is stuck on the abutment surface of the friction coupling 1003 to create a frictional force between the VCR rotation base 1001 and the friction coupling 1003.

A chassis 1005 has a hole having a diameter "g". The diameters d, f and g satisfy the condition of g>d>f. The friction coupling 1003 is attached to the chassis 1005 by bosses 1003a of the friction coupling 1003 and holes 1005a of the chassis 1005. Consequently, the VCR rotation base 1001 is rotatable, centered on the chassis 1005. The boss 1002 of the VCR rotation base 1001 has cutouts 1002a, while a rotating member 1006 is formed with retaining pieces 1006a, such that the rotating member 1006 and the VCR rotation base 1001 can be assembled each other. A plate or disk spring 1007 is mounted by bolts 1008 with a slight difference in height between the VCR rotation base 1001 and the rotating member 1006. The resilient force of the plate spring 1007 is exerted between the friction coupling 1003 and the VCR rotation base 1001. A stationary plate 1009 is fixed to the chassis 1005 with bolts. A microswitch 1010 is fixed to the stationary plate 1009.

The rotating member 1006 is formed with a rotating boss or detent 1011 and a switch boss or detent 1012. When the chassis 1005 is fixed and the VCR rotation base 1001 is rotated, the rotating boss 1011 and the switch boss 1012 rotate in interlock with the VCR rotation base 1001. At one end of the VCR rotation base 1001, the lock button 10 is mounted movably to a button holder 1013 through a compression spring 1014. A locking piece 10a of the lock button 10 is fitted in and fixed to a locking slot 1015 or 1016 of the chassis 1005 to restrict the rotating motion of the VCR rotation base 1001 centered on the chassis 1005. The VCR rotation base 1001 is integrally connected with the VCR portion 2 in FIG. 1 and the chassis 1005 is integrally connected with the camera portion 3. In this manner, the VCR portion 2 and the camera portion 3 are rotatable relative to each other. The frictional force of the friction coupling 1003 is adjustable by adjusting the tightening force of the bolts 1008. The state shown in FIG. 1 and that shown in FIG. 2 can be created between the VCR portion 2 and the camera portion 3 by the foregoing insertion and engagement of the lock button 10 with respect to the chassis 1005.

The rotating boss 1011 and the switch boss 1012 are formed integrally with the rotating member 1006 shown in FIG. 10. The motion of the rotating boss 1012 is first explained. When the boss 1011 rotates 90°, it engages the arm boss 108 of the pivotable arm 102 (FIG. 6) causing the arm 102 to pivot between the positions shown in FIGS. 4 and 5. More specifically, in FIG. 4, the rotating boss 1011 is not in abutment with the arm boss 108. Only the force of the torsion spring 104 is exerted on the pivotable arm 102 bringing the lens cover 12 into the position to cover the lens block 4. On the other hand, in FIG. 5, the rotating boss 1011 and the arm boss 108 are in abutment with each other. The arm boss 108 is now restricted positionally. Consequently, as the pivotable arm 102 pivots about the pivotal center 101, the lens cover 12 moves to the position to open the lens block 4.

When the camera portion is rotated 90° the other way from the state of FIG. 5 to the state of FIG. 4, the rotating boss 1011 and the boss 108 disengage from each other. The pivotable arm 102 reverts to its initial state under a restoring force of the torsion spring 104 and the camera cover 12 is brought to the position to cover the lens block 4.

Now, the switch boss 1012 shown in FIG. 10 will be described. The switch boss 1012 also turns 90°, centered on the chassis 1005. The chassis 1005 is fixed to the stationary plate 1009 with bolts, and the microswitch 1010 is fixed to the stationary plate 1009 with a bolt. In the initial state, the microswitch 1010 and the switch boss 1012 are set in positions in which both are not in abutment with each other. Upon rotation of the switch boss 1012 by 90°, an actuator arm of the microswitch 1010 and the switch boss 1012 come into abutment with each other camming the microswitch 1010 ON.

FIGS. 11 and 12 are explanatory views showing the operation of the rotary connecting means 11 described above in a more easily understandable manner. In FIG. 11, the connecting means 11 is set to the initial state in which the chassis 1005 is fixed and the VCR rotation base 1001 is not rotated. At this time, the VCR portion 2 and the camera portion 3 are in the state of FIG. 1.

In this state, the locking piece 10a is fitted and retained in the locking slot 1016. This state is maintained unless the lock button 10 is pushed to disengage the locking piece 10a from the locking slot 1016. Further, the rotating boss 1011 is not in abutment with the arm boss 108, and the microswitch 1010 and the switch boss 1012 are not in abutment with each other.

FIG. 12 shows a state in which the chassis 1005 is fixed, when the VCR rotation base 1001 has been rotated 90° in the clockwise direction relative to the state of FIG. 11. In this state, the locking piece 10a is inserted and retained in the locking slot 1015. This state is maintained unless the lock button 10 is pushed to disengage the locking piece 10a from the locking slot 1015, as noted previously. During rotation, the rotating boss 1011 comes into abutment with the arm boss 108, while the microswitch 1010 abuts the switch boss 1012 and turns ON.

Figure 13:
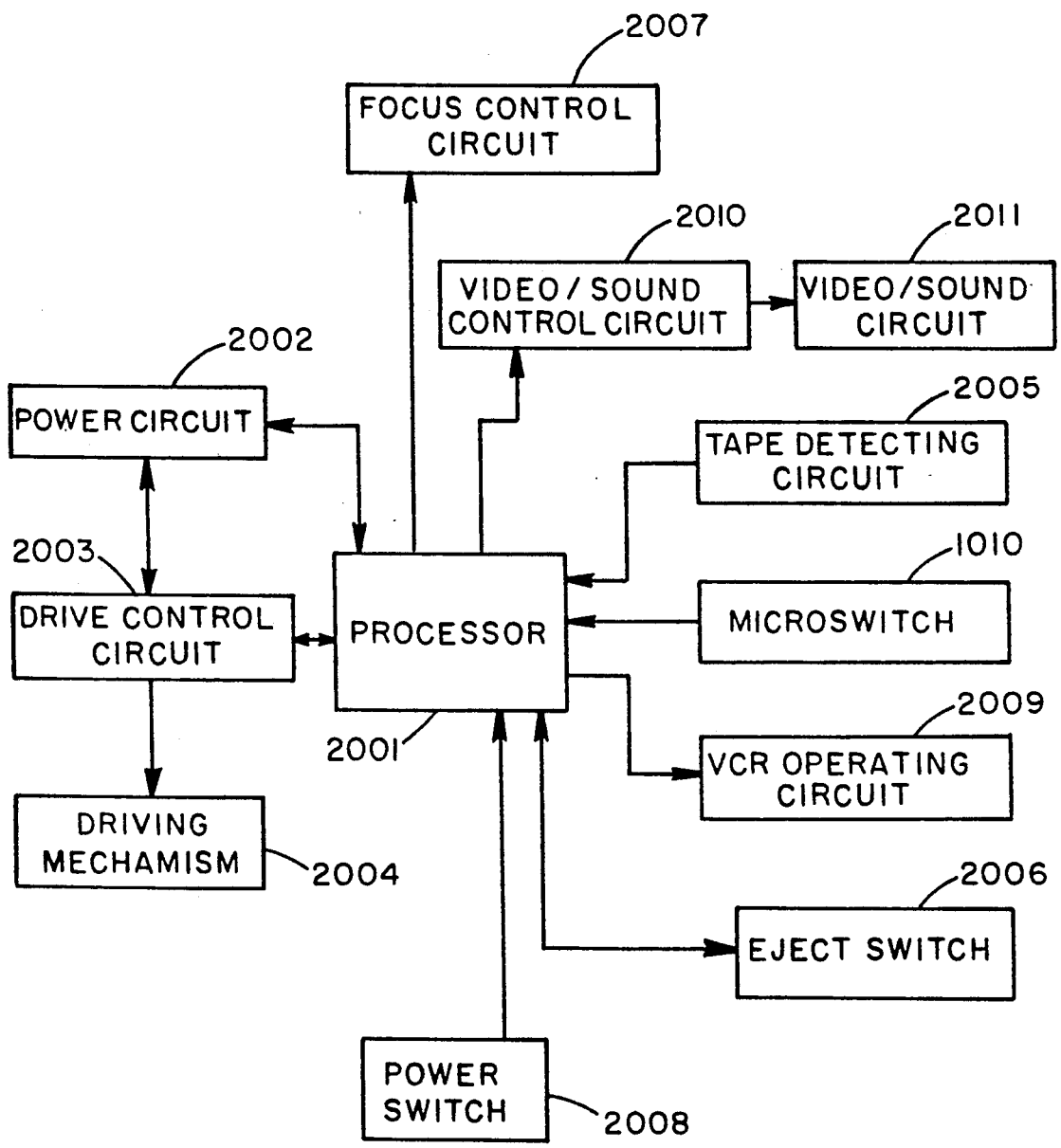
FIG. 13 is a block diagram showing a principal circuit configuration.

FIG. 13 is a block diagram showing a circuit configuration of principal components. A processor 2001, specifically a microcomputer, controls the entire circuitry system of the camera-VCR combination. The processor 2001 is provided with various I/O interfaces, a ROM containing a main control program and fixed data, a RAM for reading and writing various flags and measured and detected data, and μCPU (micro central processor unit) which controls for the processor. It is backed up with battery. A power circuit 2002 supplies a electrical power to the circuitry of the camera-VCR combination.

The power circuit 2002 is turned on/off (power supply state/power cut-off state) by the processor 2001. A drive control circuit 2003, which is supplied with electric power by the power circuit 2002, controls the operation of a driving mechanism 2004 in accordance with a control signal provided from the processor 2001 to perform tape loading/unloading operation, tape travelling operation, etc. A tape detecting circuit 2005 detects whether a tape (tape cassette) has been inserted into the VCR portion 2. In accordance with a signal provided from the detecting circuit 2005, the processor 2001 confirms the presence or absence of the tape.

According to whether microswitch 1010 is ON or OFF, the processor 2001 judges whether the camera-VCR combination 1 is in the first state or in the second state. Upon operation of an eject switch 2006, the processor 2003 provides a control signal to the drive control circuit 2003 to perform at least unloading of the tape which is in the loaded state.

When the camera-VCR combination 1 has shifted from the state shown in FIG. 1 to the state shown in FIG. 2 and the microswitch 1010 has turned ON, as previously noted, a focus control circuit 2007 which assumes an auto focus mode. In his state, the infrared autofocusing is performed, as already explained with reference to FIGS. 8 and 9. A power switch 2008 permits the supply of electric power to the camera-VCR combination 1 when either (1) after the microswitch 1010 is turned on, then the battery 6 shown in FIG. 1 is removed to cut off the supply of electric power to the camera-VCR combination 1, and the battery 6 is again mounted, or (2) the microswitch 1010 is turned off and the camera-VCR combination is brought into the state shown in FIG. 1. When the microswitch 1010 is OFF and the power switch 2008 is ON, the power switch allows electric power to be fed to the VCR portion 2. In this state, a VCR operating circuit 2009 can operate, thereby permitting the operations as VCR (play back of tape in the play back mode as well as fast forward and rewinding in the fast forward/rewind mode).

This state will hereinafter be referred to as the VCR operation state. At the same time, in this state a video/sound control circuit 2010 operates a video/sound circuit 2011. On the other hand, when both the microswitch 1010 and the power switch 2008 are ON, the power switch 2008 permits the supply of electric power to the camera portion 3 in the state shown in FIG. 2. In this state it is possible to operate the start/stop button 14 for photographing which has been explained in connection with FIG. 3. This state will hereinafter be referred to as the camera operation state.

Figure 14:
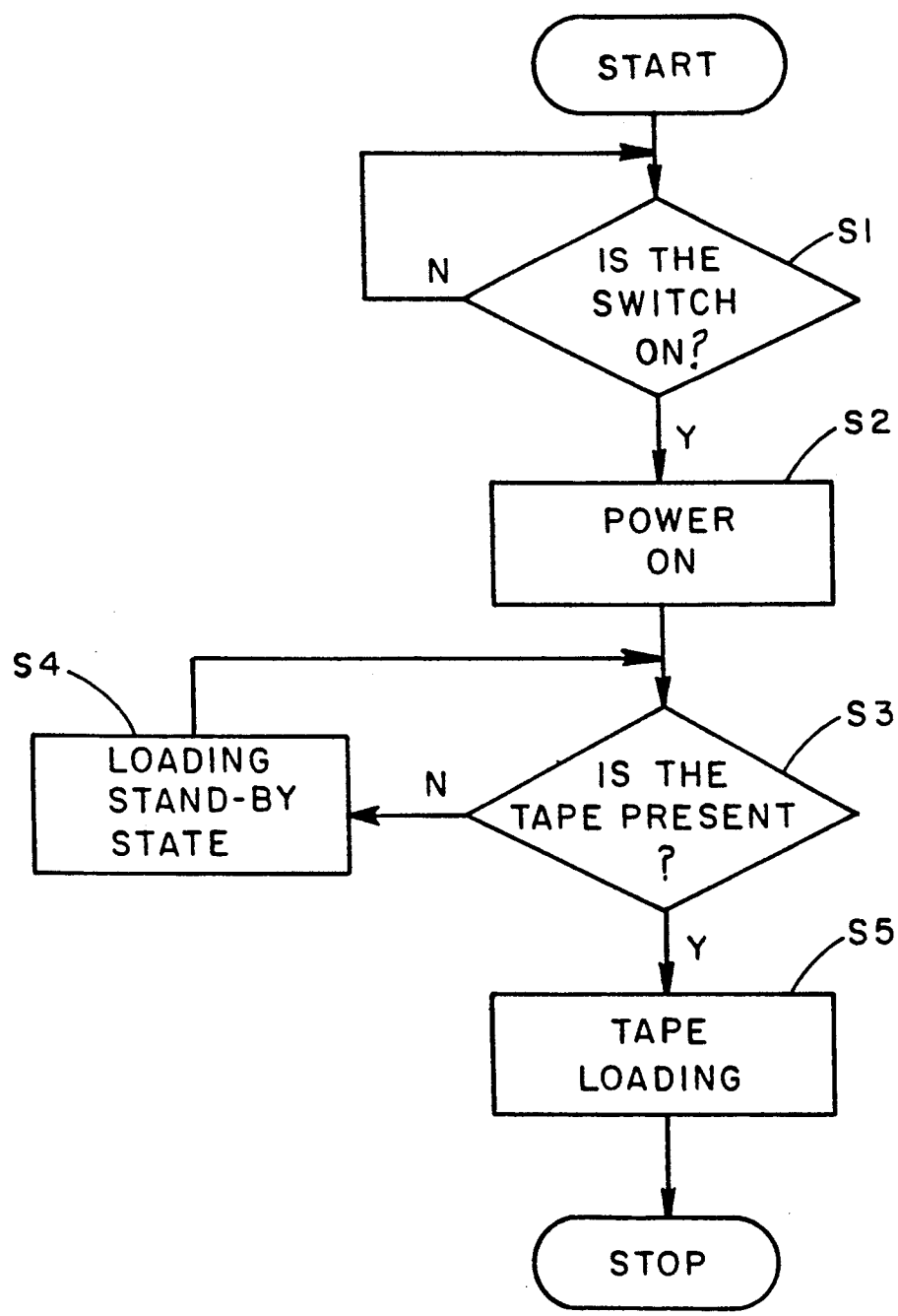
FIG. 14 is a flowchart showing an example of a processing flow in the transition from the first to the second state.

FIG. 14 is a flowchart showing an example of processings executed by the processor 2001 with the foregoing transition from the first state to the second. S1 represents a step of judging whether the microswitch 1010 has turned ON. If the answer is affirmative, the program proceeds to step S2. If the answer is negative, the program returns to step S1. In step S2, the power source is turned ON by a command provided from the processor 2001, and the program proceeds to step S3. In step S3, judgment is made as to whether the tape is present, on the basis of a signal provided from the tape detecting means 2005. If the answer is affirmative, the program proceeds to step S5. If the answer is negative, the program proceeds to step S4, in which the processor 2001 brings the drive control circuit 2003 into the loading stand-by state, then returns to step S3. In step S5, the tape is brought into the loading position by the drive control circuit 2003, so that the camera-VCR combination 1 assumes a picture recording state. Now, a series of processings are over.

For taking out the tape after the completion of picture recording in the second state, the eject switch 2006 is operated, so that the tape shifts from the loaded state to the unloading state. Thereafter, the tape is taken out by a known eject mechanism or by manual operation. When a new tape is loaded thereafter, this loading operation is performed automatically and the camera-VCR combination 1 again assumes the picture recording state.

Thus, in the camera-VCR combination 1 having the camera portion 3 which is movable relative to the VCR portion 2, by providing means for maintaining a stable, normal state in each of the first state suitable for storage and the second state suitable for photographing, it is made possible to constitute the camera-VCR combination 1 so that there will occur no trouble even in the transitional state from the first state to the second.

Although in this embodiment a parallel combination of the camera portion 3 and the grip portion is made rotatable relative to the VCR portion 2, the present invention is not limited thereto.

Table 1 shows a variety of embodiments included in the invention.

TABLE 1

| No. | 1 | 2 | 3 | 4 | 5 | 6 | 7 |
|---|---|---|---|---|---|---|---|
| VCR Portion 2 | — | — | — | — | — | — | — |
| Camera Portion 3 | O | O | O | — | O | — | — |
| Grip Portion 5 | O | O | — | O | — | O | — |
| View Finder Portion 9 | O | — | O | O | — | — | O |

—: stationary side, O: movable side

As shown in Table 1, there may be adapted:

1) a construction wherein a parallel combination of the camera portion 3, the grip portion 5, and the view finder portion 9 is movable relative to the VCR portion 2 which is fixed, or 2) a construction wherein a parallel combination of the camera portion 3 and the grip portion 5 is movable relative to a fixed parallel combination of the VCR portion 2 and the view finder portion 9, or 3) a construction wherein a parallel combination of the camera portion 3 and the view finder portion 9 is movable relative to a fixed parallel combination of the VCR portion 2 and the grip portion 5, or 4) a construction wherein a parallel combination of the view finder portion 9 and the grip portion 5 is movable relative to a fixed parallel combination of the VCR portion 2 and the camera portion 3, or 5) a construction wherein the camera portion 3 is made movable relative to a fixed parallel combination of the VCR portion 2, the grip portion 5 and the view finder portion 9, or 6) a construction wherein the grip portion 5 is movable relative to a fixed parallel combination of the VCR portion 2, the camera portion 3 and the view finder portion 9, or 7) a construction wherein the view finder portion 9 is movable relative to a fixed parallel combination of the VCR portion 2, the camera portion 3 and the grip portion 5.

According to the embodiments, as set forth above, in a camera-VCR combination including the camera portion, the VCR portion, the view finder portion, and the grip portion, at least one of the camera portion, the view finder portion, and the grip portion is movable relative to the VCR portion. A means is provided for maintaining a stable, normal state in each of the first and second states before and after the movement. In this manner, the camera-VCR combination changes without any trouble from the first to the second state. Since the camera-VCR combination is movable, it can be used properly according to whether it is in the state of storage or in any photographing state. Further, since it changes-over between VCR and camera modes automatically with the change from the first to the second state, the camera-VCR combination can be used easily by anyone. Additionally, since the lens cover of the camera can be opened and closed automatically with the change from the first state to the second, there is no fear of the user forgetting to remove or mount the lens cover or the loss of the lens cover.

Having thus described the preferred embodiment, we claim:

1. A camcorder comprising:
a first body portion having a first body portion housing which (i) houses a video tape drive means for recording received electronic video signals on and playing back electronic video signals from a video tape and (ii) supports control switches for controlling the video tape drive means;
a second body portion including a second body portion housing which houses a lens block means for converting received light images into electronic video signals, the lens block means being electrically connected with the tape drive means for supplying the electronic video signals thereto for recording;
a record button supported by one of the first body portion and the second body portion for selectively controlling recording of the electronic video signals from the lens block means by the video tape drive means; and
a rotary connecting means for rotatably connecting the first and second body portions such that the first and second body portions rotate relative to each other about an axis of rotation between a first configuration and a second configuration, the rotary connection means including:
a latch means for selectively locking the first and second body portions in at least one of the first configuration and the second configuration;
a switch for selectively controlling the lens block means, the switch having a first state which enables the lens block means to supply the electronic video signals to the video tape drive means for recording and a second state which prevents the lens block means from supplying the electronic video signals to the video tape drive means for recording, the switch being connected with the rotary connecting means for interaction therewith such that rotation of the first and second body portions relative to each other between the first and second configurations changes the switch between its first and second states, the switch being mounted inside one of the first and second body portion housings such that the first and second body portion housings and the rotary connecting means block direct contact with the switch from an exterior of the housing, such that the camcorder is operable in the first configuration to record the electronic video signals from the lens block means and is operable in the second configuration for playing back a previously recorded video tape by the video tape drive means.

2. The camcorder as set forth in claim 1 wherein:

the first body portion housing includes first and second side walls disposed on opposite sides of the axis of rotation and displaced from each other by a first distance, top and bottom walls disposed on opposite sides of the axis of rotation and displaced from each other by a second distance, and a forward wall portion extending from a lower end adjacent the rotary connecting means upward and rearward away from the second body portion, the second distance being greater than the first distance;

the second body portion housing includes first and second side walls disposed on opposite sides of the axis of rotation and displaced from each other by substantially the first distance, top and bottom walls disposed to opposite sides of the axis of rotation and displaced from each other by substantially the second distance, the second body portion bottom wall extending to a point contiguous with the rotary connecting means and the top wall having a portion extending rearward to a rearward edge contiguous with an upper end of the first body portion housing forward wall portion;

the latch means selectively locks the first and second body portions such that in the second configuration, the first and second body portion housing side walls are substantially aligned and the first and second body portion housing top walls are substantially aligned and such that in the first configuration, the second body portion is rotated about 90° relative to the first body portion housing;

the recording button is mounted to the second body portion housing adjacent the top wall rearward edge such that the record button is disposed between the first and second body portion housings in the second configuration and such that the record button is accessible to an operator's thumb in the first configuration, the rearward extending top wall portion in the first configuration facilitating gripping of the second body portion with the operator's hand and providing a guide surface for facilitating actuation of the record button by the operator's thumb.

3. The camcorder as set forth in claim 1 wherein the rotating connecting means includes:

a first member defining a first aperture therein mounted to the first body portion housing;

a second member defining a second aperture therein mounted to the second body portion housing, the first and second members defining annular bearing surfaces circumscribing the first and second apertures, an electrical lead extending through the first and second apertures to the video tape drive means.

4. A camcorder comprising:

a first body portion (i) housing a video tape drive means for recording received electronic video signals on and playing back electronic video signals from a video tape and (ii) supporting control switches for controlling the tape drive means;

a second body portion housing a lens block means for converting received light images into electronic video signals, the lens block means being electrically connected with the video tape drive means for supplying the electronic video signals thereto for recording;

a record button supported by one of the first body portion and the second body portion for selectively controlling recording of the electronic video signals from the lens block means by the video tape drive means;

a rotary connecting means for rotatably connecting the first and second body portions, the rotary connection means including:

a first member defining a first aperture therein mounted to the first body portion;

a second member defining a second aperture therein mounted to the second body portion, the first and second members defining annular bearing surface circumscribing the first and second apertures, an electrical lead extending through the first and second apertures to the video tape drive means;

a disk spring mounted between the first and second members for providing a selective coefficient of rotational drag between the bearing surfaces of the first and second members;

a latch means for selectively locking the first and second body portions in at least one of a first configuration and a second configuration, in the second configuration, the first body portion is rotated relative to the second body portion by a different amount of rotation than in the first configuration;

a switch means for selectively controlling the lens block means, the switch means having a first state in which the lens block means is operable to supply the electronic video signals to the video tape drive means for recording and a second state in which the lens block means is prevented from supplying the electronic video signals to the video tape drive means for recording, the switch means being connected with the rotary connecting means for interaction therewith such that rotation of the first and second body portions relative to each other between the first and second configuration changes the switch means between its first and second states, the switch means being mounted to one of the first body portion, the second body portion, and the rotary connecting means, such that the camcorder is operable in the first configuration to record the electronic video signals from the lens block means and is operable in the second configuration for playing back a previously recorded video tape by the video tape drive means.

5. The camcorder as set forth in claim 3 wherein the switch is mounted to one of the first and second members, the stitch including an extending mechanical actuator for changing the switch between the first and second states;

a detent connected with the other of the first and second members for selectively engaging the extending mechanical actuator in one of the first and second configurations.

6. The camcorder as set forth in claim 3 wherein the second body portion includes:

a lens cover which is selectively movable between a lens covering position and a lens exposing position;

a mechanical linkage extending from the lens cover, a means connected with one of the rotary connecting means first member and the first body portion for interacting with the mechanical linkage at least as the first and second body portions are rotated relative to each other to the first configuration to move the lens cover to the lens exposing position.

7. The camcorder as set forth in claim 1 wherein:
the second body portion includes a lens cover that is selectively movable between a lens covering position and a lens exposing position;
a mechanical linkage connected between the lens cover and the rotary connecting means for selectively moving the lens cover between the lens covering position and the lens exposing position as the first and second body portions are rotated to the first configuration.

8. The camcorder as set forth in claim 7 wherein:
the second body portion further includes an autofocus means mounted adjacent the lens block means for automatically focusing the lens block means, the autofocus means emitting an infrared beam and receiving reflected infrared light;
the lens cover including an infrared transmissive, dust impermeable portion which aligns with the autofocus means in the lens exposing position, whereby the lens block means cover protects the lens block means from dust in the lens covering position and transmits the infrared beam from and the reflected infrared light to the autofocus means in the lens exposing position.

9. A camcorder comprising:
a first body portion (i) housing a video tape drive means for recording received electronic video siganls and playing back electronic video signals from a video tape and (ii) supporting control switches for controlling the tape drive means;
a second body portion including:
a housing which encloses a lens block means for converting received light image into electronic video signals, the lens block means being electrically connected with the tape drive means for supplying the electronic video signals thereto to be recorded;
a lens cover that is selectively movable between a lens covering position in which the lens cover covers the lens block means and a lens exposing position in which the lens cover exposes the lens block means to receive the light images; and
a mechanical linkage connected with the lens cover for selectively moving the lens cover beween the lens covering position and the lens exposing position;
a record button for selectiely controling recording of the electronic video signals from the lens block means by the video drive means;
a rotary connecting means for rotatably connecting the first and second body portions such that the second body portion is rotatable relative to the first body portion;
one of the rotary connecting means and the first body portion engaging the mechanical linkage at least as the second body portion is rotated relative to the first body portion to drive the mechanical linkage to move the lens cover between the lens exposing position and the lens covering position.

10. The camcorder as set forth in claim 9 wherein:
the second body portion further includes an autofocus means mounted adjacent the lens block means for automatically focusing the lens block means, the autofocus means emitting an infrared beam and receiving reflected infrared light;
the lens cover including an infrared transmissive, dust impermeable portion which aligns with the autofocus means in the lens exposing position.

11. A camera-VCR combination comprising:
a VCR portion including a video tape drive means for recording and playing back a video tape and control switches for controlling the video tape drive means, the VCR portion having a camera operation mode in which the VCR portion records received electronic video signals on the video tape and a VCR operation mode in which the VCR portion plays back the video tape;
a camera portion including a lens block means for converting received light images into electronic video signals, the lens block means being electrically connected with the video tape drive means for supplying the electronic video signals thereto for recording;
connecting means for movably connecting the VCR portion with the camera portion such that the VCR and camera portions are movable relative to each other for movement between a first position and a second position; and
a switching means mounted inside at least one of the VCR and camera portions and the connecting means for switching to the camera mode in the first position and to the VCR operation mode in the second position, the switching means being disposed completely inside the VCR and camera portions and the connecting means such that the switching means is not subject to direct interaction from an exterior of the VCR and camera portions and the connecting means to cause the switching means to switch between the camera and VCR modes except by movement of the VCR and camera portions between the first and second positions.

12. In a camera-VCR combination that includes a VCR portion housing a video tape drive means for recording and playing back a video tape, the VCR portion being operable in a camera operation mode in which the VCR portion records the video tape and in a VCR operation mode in which the VCR portion plays back the video tape, a camera portion housing a lens block means for converting received light images into electronic video signals, the lens block means being electrically connected with the video tape drive means for supplying the electronic video signals thereto for recording, a view finder portion housing a view finder for converting the electronic video signals into viewable images, the view finder being electrically connected with one of the video tape drive means and the lens block means for receiving the electronic video signals therefrom, and a grip portion operatively connected with one of the VCR, camera, and view finder portions for providing a holding grip for a operator, the improvement characterized in that
a connecting means movably connects at least one of the camera portion, the view finder portion, and the grip portion with respect to the VCR portion such that at least one of the camera portion, the view finder portion, and the grip portion is humanly relative to the VCR portion between first and second positions and a means is located inside one of the connecting means, VCR, camera, view finder, and grip portions for switching the operation mode of the VCR portion in response to movement between the first and second positions, the switching means being disposed such that it cannot be reached by direct contact to switch the operation mode of the VCR portion by direct interaction in both of the first and second positions.

13. A camcorder which is operable in a camera mode for recording electronic data corresponding to optical images and a VCR mode for playing back previously recorded electronic data, the camcorder comprising:

a first body portion that includes a means for recording electronic data in the camera mode and playing back previously recorded electronic data in the VCR mode;

a second body portion that includes a means for converting received optical images into electronic data for recording by the recording means in the camera mode;

a connection means for connecting the first and second body portions such that the second body portion is movable relative to the first body portion between a first position and a second position;

a switch means for switching the camcorder to the camera mode in the first position and to the VCR mode in the second position, the switch means being disposed within an interior of the body portions such that the switching means is not subject to direct contact by an operator of the camcorder to switch the switching means between the camera and VCR modes.

14. A camcorder which is operable in a camera mode for recording electronic data representing optical images and a VCR mode for playing back previously recorded electronic data, the camcorder comprising:

a first body portion that includes a magnetic recording means for magnetically recording electronic data in the camera mode and playing back previously recording electronic data in the VCR mode;

a second body portion that includes a means for converting receiving optical images into electronic data for magnetic by the electronic recording means in the camera mode;

a connection means for connecting the first and second body portions such that the second body portion moves relative to the first body portion between a first position and a second position;

a lens cover control means for moving a lens cover to a lens exposing location as the second body portion is moved to the first position and for moving the lens cover to a lens covering location as the second body portion is moved to the second position.

* * * * *

UNITED STATES PATENT AND TRADEMARK OFFICE
CERTIFICATE OF CORRECTION

PATENT NO. : 5,303,062
DATED : April 12, 1994
INVENTOR(S) : Takeshi Kawarai, et al.

It is certified that error appears in the above-indentified patent and that said Letters Patent is hereby corrected as shown below:

Claim 1, column 8, line 63, delete "housing" and substitute therefor --housings--.

Claim 4, column 10, line 14, delete "surface" and substitute therefor --surfaces--.

Claim 5, column 10, line 53, delete "stitch" and substitute therefor --switch--.

Claim 9, column 11, line 35, delete "image" and substitute therefor --images--.

UNITED STATES PATENT AND TRADEMARK OFFICE
CERTIFICATE OF CORRECTION

PATENT NO. : 5,303,062
DATED : April 12, 1994
INVENTOR(S) : Takeshi Kawarai, et al.

It is certified that error appears in the above-indentified patent and that said Letters Patent is hereby corrected as shown below:

Claim 12, column 12, lines 61-62, delete "humanly" and substitute therefor --movable--.

Claim 12, column 12, line 63, after "positions" insert -- , --.

Claim 14, column 14, line 10, delete "recording" and substitute therefor --recorded--;

line 12, delete "receiving" and substitute therefor --received--; and, line 13, before "magnetic" insert --recording by the-- and delete "by the electronic".

Signed and Sealed this

Sixteenth Day of August, 1994

BRUCE LEHMAN

Attest:

Attesting Officer

Commissioner of Patents and Trademarks

UNITED STATES PATENT AND TRADEMARK OFFICE
CERTIFICATE OF CORRECTION

PATENT NO. : 5,303,062
DATED : April 12, 1994
INVENTOR(S) : T. Kawarai et al.

It is certified that error appears in the above-indentified patent and that said Letters Patent is hereby corrected as shown below:

In claim 8, column 11, Line 22, please delete "block means".

Signed and Sealed this

Fourteenth Day of February, 1995

Attest:

BRUCE LEHMAN

Attesting Officer

Commissioner of Patents and Trademarks